(12) United States Patent
Kaga

(10) Patent No.: US 7,762,663 B2
(45) Date of Patent: Jul. 27, 2010

(54) SPECTACLE LENS DESIGN METHOD

(75) Inventor: Tadashi Kaga, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 153 days.

(21) Appl. No.: 11/834,867

(22) Filed: Aug. 7, 2007

(65) Prior Publication Data
US 2008/0284978 A1 Nov. 20, 2008

(30) Foreign Application Priority Data
Aug. 31, 2006 (JP) ............... 2006-235142

(51) Int. Cl.
G02C 1/00 (2006.01)
(52) U.S. Cl. ............... 351/177; 351/41; 351/168
(58) Field of Classification Search ........... 351/44, 351/168–172, 177
See application file for complete search history.

(56) References Cited

U.S. PATENT DOCUMENTS 6,019,470 A * 2/2000 Mukaiyama et al. ........ 351/169
6,142,624 A 11/2000 Morris et al.
7,070,274 B2 * 7/2006 Kamishita et al. ........... 351/159

FOREIGN PATENT DOCUMENTS

| EP | 1 582 909 A1 | 10/2005 |
| EP | 1 688 780 A1 | 8/2006 |
| JP | 2005-284059 A | 10/2005 |
| JP | 2006-215303 A | 8/2006 |
| WO | 97/19382 A1 | 5/1997 |
| WO | WO 97/35224 A1 | 9/1997 |
| WO | WO 99/63392 A1 | 12/1999 |

* cited by examiner

Primary Examiner—Darryl J Collins
(74) Attorney, Agent, or Firm—Sughrue Mion, PLLC (57) ABSTRACT

A spectacle lens design method for designing a spectacle lens, including setting a distance portion, a near portion, and a progressive portion which is disposed between the distance portion and the near portion; adding astigmatic power for canceling aberration produced by a bend angle of the spectacle frame; determining an aspherical surface addition quantity; and adding prismatic power for canceling prismatic power produced by the bend angle of the spectacle frame at the design reference point of the distance portion to the entire distance portion and prismatic power for cancelling prismatic produced by the bend angle of the spectacle frame at the design reference point of the near portion to the entire near portion on either the object side refractive surface or the eyeball side refractive surface of the spectacle lens.

6 Claims, 4 Drawing Sheets

SPECTACLE LENS DESIGN METHOD

BACKGROUND

1. Technical Field

The present invention relates to a spectacle lens design method for designing a presbyopia correcting progressive-power lens attached to a spectacle frame having a large bend angle such as a wraparound-type frame.

2. Related Art

Figure 3A:
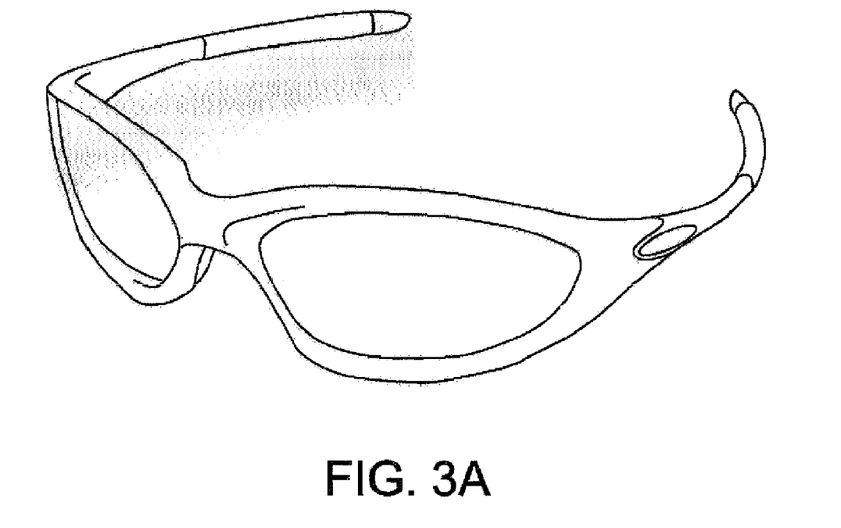
FIG. 3A is a perspective view of the spectacle frame as viewed obliquely.
Figure 3B:
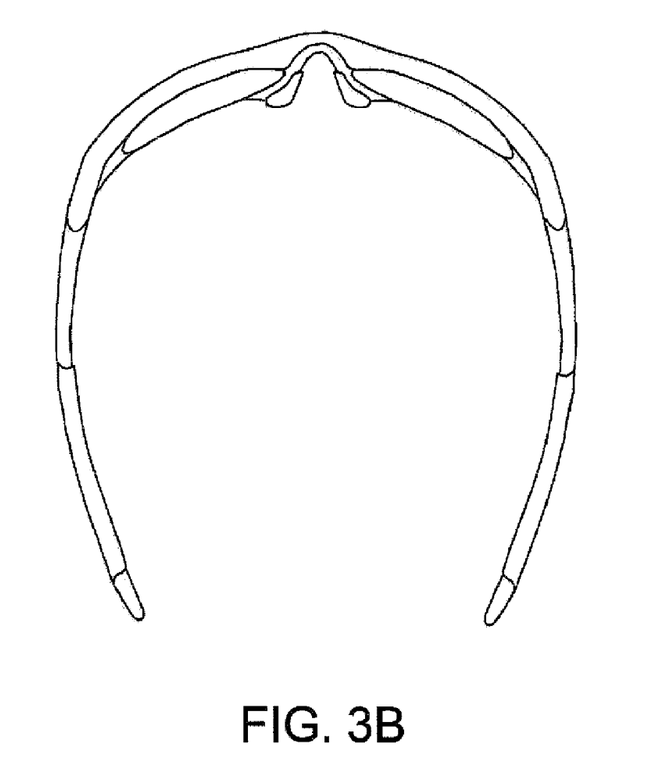
FIG. 3B is a perspective view as viewed from above.

Recently, a wraparound-type spectacle frame chiefly for sport sunglasses has been increasingly used. FIGS. 3A and 3B are perspective views of an example of wraparound-type spectacle frame as viewed obliquely and from above, respectively. As illustrated in FIGS. 3A and 3B, the wraparound-type spectacle frame having a large bend angle is curved along the shape of the wearer's face. Thus, lenses attached to the wraparound frame reach the sides of the face, and provide wide vision. For this reason the wraparound-type spectacle frame is used for spectacles such as protection spectacles for sports and eyeball protection spectacles to be worn by athletes.

With rise in the number of the athletes wearing wraparound-type spectacle frames, ordinary people wearing the wraparound-type frame are also increasing. Thus, an increasing number of people who need correcting glasses desire to use the wraparound-type spectacle frame.

In order to meet this demand, JP-A-2005-284059 discloses an optical design method appropriate for a spectacle frame having a large bend angle such as a wraparound-type frame.

However, the optical design method disclosed in the above reference does not include a design method for a presbyopia correcting progressive-power lens. Recently, there is a demand for using the wraparound-type sport spectacle frame for the progressive-power lens which corrects hyperopia and myopia by one lens.

SUMMARY

It is an advantage of some aspects of the invention to provide a spectacle lens design method for designing a presbyopia correcting progressive-power lens which can provide the optimum optical characteristics when the presbyopia correcting progressive-power lens is attached to a spectacle frame having a large bend angle such as a wraparound-type frame.

A spectacle lens design method for designing a spectacle lens attached to a spectacle frame having a bend angle of 200 degrees or larger according to an aspect of the invention includes: setting a distance portion, a near portion having power different from power of the distance portion, and a progressive portion which is disposed between the distance portion and the near portion and has power progressively varying on at least either an object side refractive surface or an eyeball side refractive surface included in the spectacle lens; adding astigmatic power for canceling aberration produced by the bend angle of the spectacle frame at a design reference point of the distance portion to the entire distance portion and astigmatic power for canceling aberration produced by the bend angle of the spectacle frame at a design reference point of the near portion to the entire near portion on either the object side refractive surface or the eyeball side refractive surface of the spectacle lens; determining an aspherical surface addition quantity which provides the optimum optical properties throughout the object side refractive surface or the eyeball side refractive surface of the spectacle lens; and adding prismatic power for canceling prismatic power produced by the bend angle of the spectacle frame at the design reference point of the distance portion to the entire distance portion and prismatic power for canceling prismatic power produced by the bend angle of the spectacle frame at the design reference point of the near portion to the entire near portion on either the object side refractive surface or the eyeball side refractive surface of the spectacle lens.

The spectacle lens design method according to this aspect of the invention is a method for designing a progressive-power lens provided with a progressive refractive surface which has the distance portion, the near portion having power different from power of the distance portion, and the progressive portion which is disposed between the distance portion and the near portion and has power progressively varying on the object side refractive surface or the eyeball side refractive surface of the spectacle lens. Astigmatic power, prismatic power and the like are produced on the spectacle lens by the presence of the bend angle of the spectacle frame, and it is necessary to correct these powers. The progressive refractive surface has the distance portion and the near portion, and there is a difference in dioptric power called addition power between these portions. Since the astigmatic power and the prismatic power to be added by correction differ depending on the dioptric power, correction quantity to be added to the distance portion is different from that to be added to the near portion. In addition, the progressive portion having the intermediate portion whose dioptric power gradually varies exists, and the inclination angles to the vision on the left side and the right side are asymmetric with respect to the vision in a spectacle lens inclined with respect to the vision in the left-right direction. Thus, the correction quantity on the ear side is different from the correction quantity on the nose side.

According to the design method of this aspect of the invention, therefore, the reference progressive refractive surface is initially established, and the design reference point is set for each of the distance portion and near portion. Then, astigmatic powers for canceling astigmatic powers produced by the bend angle at the respective design reference points of the distance portion and near portion are added to the distance portion and near portion. Subsequently, the aspherical surface addition quantity providing the optimum optical properties is calculated for the entire refractive surface on the object side or the eyeball side. Finally, prismatic powers for canceling prismatic powers produced by the bend angle of the spectacle frame at the respective design reference points of the distance portion and near portion are added to the distance portion and near portion. By correcting the effect caused by the presence of the bend angle using this method, the progressive-power lens can be attached to the spectacle frame having the large bend angle.

In the spectacle lens design method according to this aspect of the invention, it is preferable that the aspherical surface addition quantity determining step determines the aspherical surface addition quantity by setting a plurality of reference lines extending radially from a geometrical center of the spectacle lens through the distance portion of the spectacle lens to the edge of the spectacle lens and a plurality of reference lines extending through the near portion of the spectacle lens to the edge of the spectacle lens, calculating aspherical surface addition quantities providing the optimum optical properties on the respective reference lines, and calculating aspherical surface addition quantities for areas between the reference lines by interpolation.

In the spectacle lens inclined to the vision in the left-right direction, the inclination angles to the vision on the left side and the right side of the design reference point are asymmetric with respect to the vision. Thus, even when the astigmatic power and prismatic power produced by the bend angle are corrected at the design reference point, correction is not completely executed for the entire spectacle lens. Thus, reference lines are set for the distance portion and the near portion, and aspherical surface addition quantities providing the optimal optical properties along the reference lines are calculated. Then, aspherical surface addition quantities in the area between the reference lines are calculated. By this method, the aspherical surface addition quantity providing the optimum optical properties for the entire spectacle lens can be obtained.

BRIEF DESCRIPTION OF THE DRAWINGS

The invention will be described with reference to the accompanying drawings, wherein like numbers reference like elements.

FIGS. 3A and 3B illustrate a wraparound-type spectacle frame.

DESCRIPTION OF EXEMPLARY EMBODIMENT

An embodiment according to the invention is hereinafter described. It should be noted that the scope of the invention is not limited to this particular embodiment described herein.

Figure 4A:
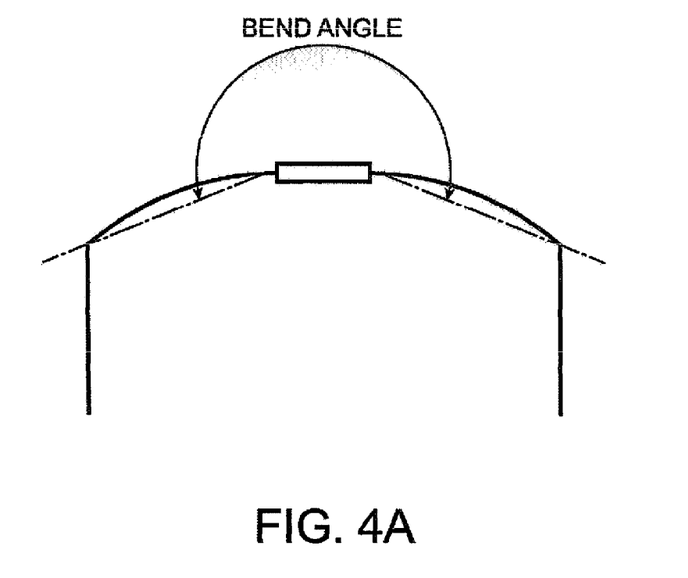
FIGS. 4A and 4B illustrate general ideas about a bend angle and an inclination angle, respectively.

A spectacle lens design method according to the embodiment of the invention is a method for designing a progressive-power lens capable of providing the optimum optical characteristics when the progressive-power lens is attached to a wraparound-type spectacle frame having a large bend angle shown in FIGS. 3A and 3B. The bend angle of the spectacle frame refers to an angle formed by left and right rim surfaces as illustrated in FIG. 4A, and produces inside bend condition when the bend angle is smaller than 180 degrees, and outside bend condition when the bend angle is larger than 180 degrees. The spectacle lens design method according to the embodiment of the invention designs a progressive-power lens having optical properties suitable for a spectacle frame in the outside bend condition having a bend angle of 200 degrees or larger. The bend angles of wraparound-type spectacle frames now available on the market lie in the range from about 200 to about 250 degrees. A spectacle frame having a bend angle of 200 degrees or larger is used for a wraparound-type spectacle frame as shown in FIGS. 3A and 3B, water goggles, protection glasses, or the like.

The spectacle frame having an angle of 200 degrees or larger is curved along the shape of the wearer's face. Thus, the spectacle lens is fixed in such a condition as to be inclined with respect to the vision. The spectacle lens attached to the spectacle frame having a bend angle of 200 degrees or larger needs to have a larger curvature than that of an ordinary spectacle lens. The curvature of the object side refractive surface is generally 5 dioptres or larger when expressed in power, and typically in the range from 6 to 12 dioptres.

The object side refractive surface and the eyeball side refractive surface of the ordinary spectacle lens are designed assuming that the lens is attached to a spectacle frame having a bend angle of 180 degrees, that is, having no bend. For eye examination, a spectacle frame for eye examination having no bend is used. When the spectacle lens having optical properties appropriate for the spectacle frame having no bend is fixed in such a condition as to be inclined with respect to the vision, a problem arises in view of optical properties.

When a spectacle lens is attached to a spectacle frame having a large bend angle in such a condition as to be inclined to the vision, the power in the left-right direction is changed with the power in the up-down direction kept substantially unchanged. In this case, aberration is produced and astigmatic effect is given to the spherical surface lens. In addition, when the spectacle lens is inclined with respect to the vision, prismatic power is produced.

Thus, when the spectacle lens appropriate for the spectacle frame having the bend angle of 180 degrees is attached to a spectacle frame having a bend angle of 200 degrees or larger, at least the prismatic power and the aberration produced by the bend angle and producing astigmatic power are present on the spectacle lens. Thus, blurred images are viewed through the spectacle lens. The design method disclosed in JP-A-2005-284059 can solve this problem, but this design method is practically used for a single focus lens.

The spectacle lens design method according to the embodiment of the invention is a method for designing a presbyopia correcting progressive-power lens which provides the optimum optical properties when attached to a spectacle frame having a large bend angle such as a wraparound-type spectacle frame.

According to the design method of the embodiment of the invention, a reference progressive refractive surface is initially established, and a design reference point is determined for a distance portion and a near portion (progressive refractive surface setting step). Then, astigmatic powers for canceling astigmatic powers produced by a bend angle at the respective design reference points in the distance portion and the near portion are added (astigmatic power adding step). Subsequently, an aspherical surface addition quantity providing the optimum optical properties is calculated throughout the object side refractive surface or the eyeball side refractive surface (aspherical surface addition quantity determining step). Further, prismatic powers for canceling prismatic powers produced by the bend angle of the spectacle frame at the respective design reference points in the distance portion and the near portion are added (prismatic power adding step).

In the progressive refractive surface setting step, a reference progressive refractive surface is established. In the design of the progressive-power lens, the spectacle lens is divided into regions of a distance portion located in the upper area of the lens for viewing a distant place, a near portion located in the lower area of the lens for viewing a near object, and a progressive portion smoothly connecting the distance portion and the near portion for viewing an intermediate distance. In the aspect of spectacle use, the progressive-power lens design is roughly divided into so-called distance and near combination design providing balanced arrangement of both distant view and near view, distance and intermediate design chiefly providing wide and distant view and intermediate view, and intermediate and near design chiefly providing view in the range from the intermediate area around 1 meter of the wearer to the close area. In the aspect of distributions of distorted aberration and astigmatism, the progressive-power lens design is roughly divided into aberration concentrated type having the widened distance portion and near portion and concentrated aberration in the narrow progressive portion, and aberration dispersed type having the narrowed distance portion and near portion and dispersed intermediate portion aberration in the widened progressive portion. The spectacle lens design method according to the embodiment of the invention is applicable to progressive-power spectacle lenses in all categories. The progressive refractive surface may be provided either on the object side refractive surface (outside surface) or on the eyeball side refractive surface (inside surface), or may be divided to be formed on both surfaces.

Figure 1:
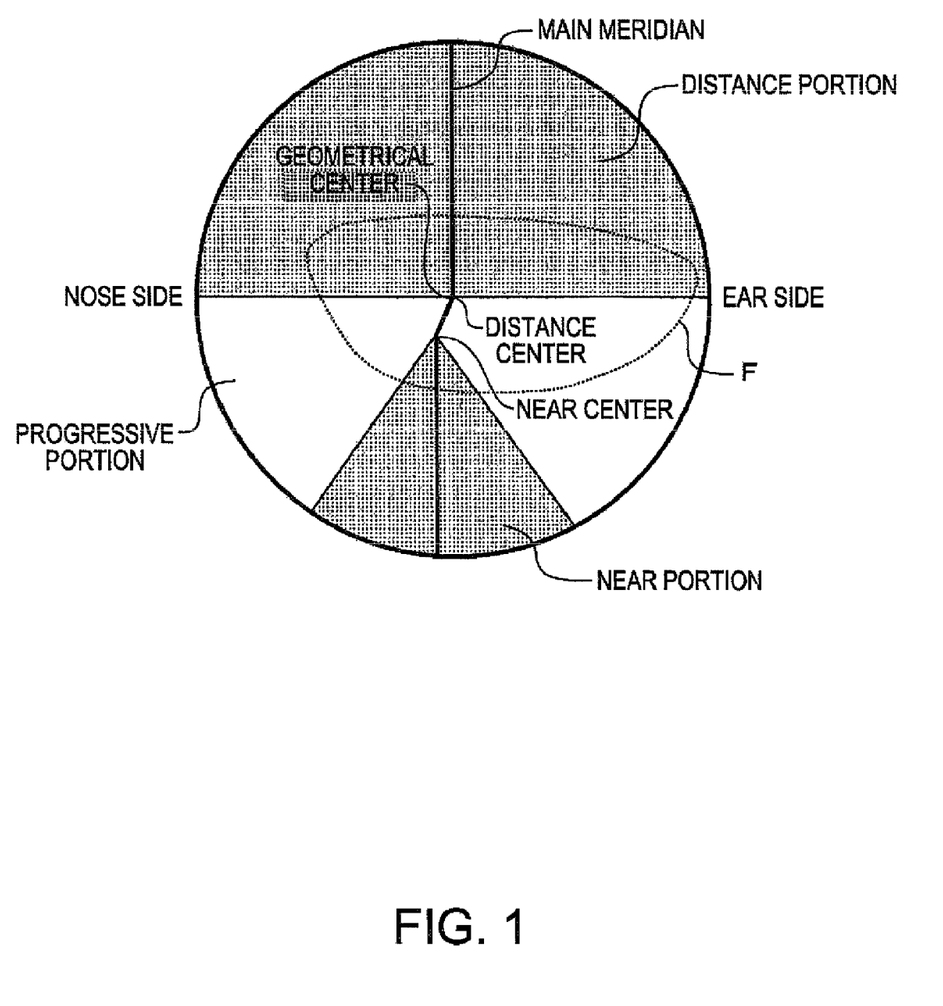
FIG. 1 illustrates a general idea about division of a reference progressive refractive surface in a spectacle lens design method according to an embodiment of the invention, showing an example of the division.

FIG. 1 illustrates an example of divisions of the distance portion, near portion, and progressive portion on the reference progressive-power lens. The distance portion and near portion are sectors having a distance center and a near center, respectively. The distance and near portions are indicated by dotted areas in the figure. This spectacle lens is for the left eye, and its main meridian indicated by a relatively bold line is curved toward the nose in the left side of the figure from the distance center to the near center considering congestion of the eye. The shape of the lens to be attached to the wraparound-type spectacle frame indicated by a broken line is an elongate shape in the transverse direction, which shape is long in the left-right direction and short in the vertical direction. The wraparound-type spectacle is for sport use, and requires wide view in the left-right direction in the distance portion. Thus, the distance portion occupies the upper half above the boundary of the horizontal line passing the geometrical center of the round lens. The main meridian extends in the central area of the distance portion in the vertical direction, and reaches the distance center (geometrical center) at the lower end of the distance portion. Then, the main meridian slightly turns toward the nose considering the congestion in the progressive portion to reach the near center, and again extends in the vertical direction to reach the lens lower end. The progressive band length as the length of the progressive portion is slightly short, and the progressive portion on which aberration is concentrated is relatively narrow. Thus, the addition power as the difference in dioptric power between the distance portion and the near portion is at most approximately 2.0. When the addition power is larger than this value, aberration is concentrated on the progressive portion and waving and distortion are caused. Thus, the spectacle lens having excessively large addition power is inappropriate for sport use. Though the near portion is narrowed, only such an emergency level of addition power which can provide view sufficient for recognizing golf scores is required. Obviously, the reference progressive-power lens can be divided by methods other than that shown in FIG. 1.

Figure 4B:
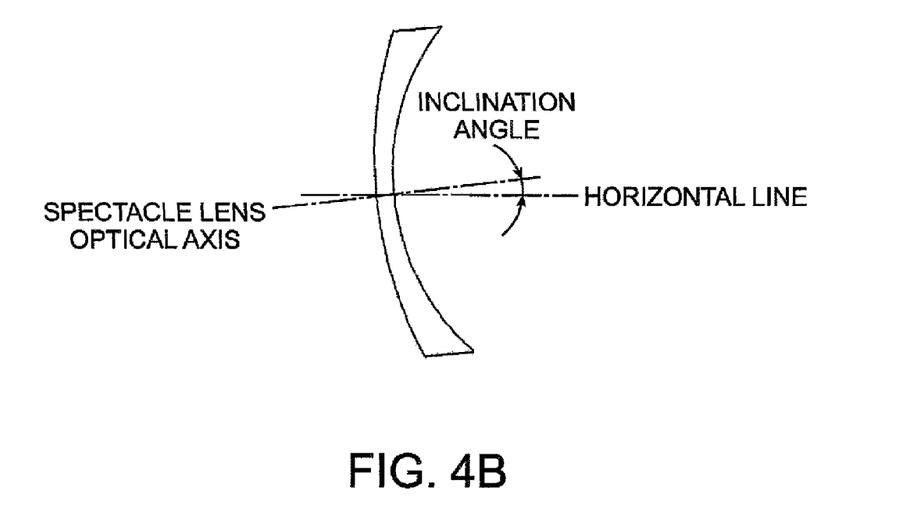

The progressive-power lens having the bend angle of 180 degrees according to the prescription in the ordinary design is established as the reference progressive-power lens. The inclination angle shown in FIG. 4B is 10 degrees, for example, which is added to the reference progressive-power lens. In the following description, therefore, only effect of the bend angle is corrected assuming that no effect of the inclination angle exists.

Next, the design reference point is established for each of the distance portion and the near portion. Astigmatic aberration and prismatic power produced by the bend angle vary according to the dioptric power of the lens. The dioptric power of the distance portion is different from that of the near portion, and it is thus necessary to individually correct the effect of the bend angle for the distance portion and the near portion. The design reference point may be an arbitrary position. Generally, the design reference point in the distance portion is the distance eye point as a passing position of the vision on the lens when the wearer of the spectacles views a distant place with natural posture. The distance eye point coincides with the distance center in some cases. Also, the distance eye point generally agrees with the geometrical center of the lens. In the following description, it is assumed that the distance center coincides with the geometrical center of the lens, and that the distance center (geometrical center) is the design reference point in the distance portion. As for the near portion, it is preferable that the near center corresponds to the design reference point in the near portion.

In the astigmatic power adding step, astigmatic power for canceling the aberration produced by the bend angle of the spectacle frame at the design reference point of the distance portion is added to the entire distance portion on the object side or eyeball side refractive surface of the spectacle lens. In addition, astigmatic power for canceling the aberration produced by the bend angle of the spectacle frame at the design reference point of the near portion is added to the entire near portion.

In distance portion correction, the astigmatic power for correction according to the bend angle and the dioptric power of the distance portion is added to the entire distance portion to cancel the astigmatic power produced by the bend angle at the design reference point of the distance portion using the correcting astigmatic power thus added such that the astigmatic power becomes zero. In near portion correction, a sector area including the entire near portion whose center is located at the geometrical center and the main meridian of the progressive portion is established, for example. Then, the correcting astigmatic power according to the bend angle and the dioptric power of the near portion is added to the established sector area to cancel the astigmatic power produced by the bend angle at the design reference point of the near portion using the correcting astigmatic power thus added such that the astigmatic power becomes zero. The correction is added to the near portion and the area including the main meridian of the progressive portion as one area so as to prevent discontinuity of the progressive portion. For the regions located on the left and right sides of the progressive portion, interpolation can be executed in such a manner as to smoothly connect the respective correction values for the distance portion and near portion.

In the aspherical surface addition quantity determining step, an aspherical surface addition quantity for providing the optimum optical properties throughout the object side refractive surface or eyeball side refractive surface is calculated. Even when the astigmatic and prismatic aberrations produced by the bend angle are corrected at the design reference point, the inclination angles with respect to the vision are asymmetric on the left side and right side of the design reference point for the entire spectacle lens inclined with respect to the vision in the left-right direction. Thus, correction is not completely performed. In the aspherical surface addition quantity determining step, therefore, a plurality of reference lines (straight lines) extending from the geometrical center of the spectacle lens through the distance portion to the spectacle lens edge in the radial directions are initially established. Also, a plurality of reference lines (straight lines) extending from the geometrical center of the spectacle lens through the near portion to the spectacle lens edge in the radial directions are established. In this step, it is preferable that the reference line extending at least in one direction is set in each of the left and right regions, that is, at least two reference lines in total are set for each of the distance portion and the near portion. The reference line is established in each of the left and right regions for the distance portion and near portion because the correction quantities on the nose side and on the ear side are asymmetric with the boundary of the vision when the lens is inclined with respect to the vision due to the presence of the bend angle.

Figure 2A:
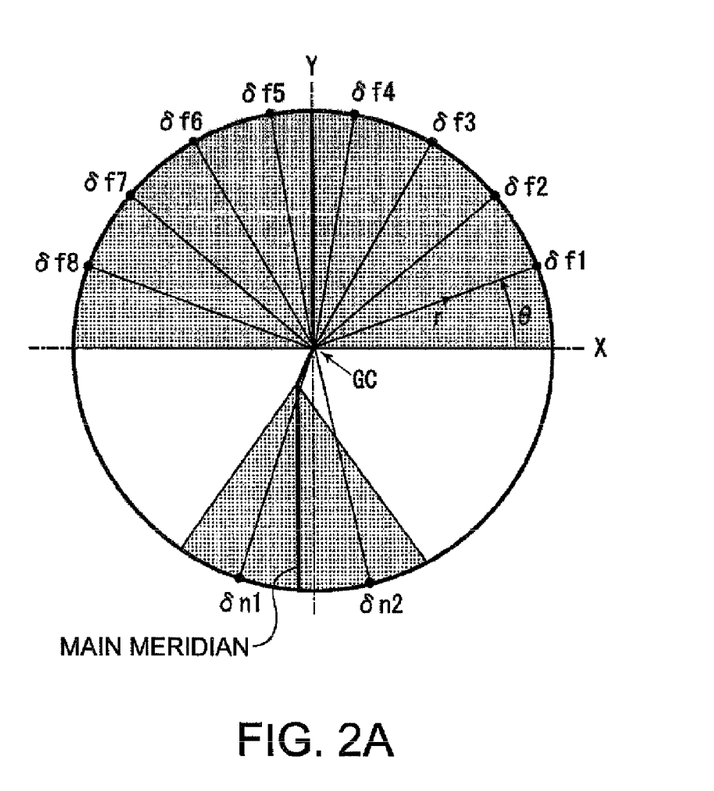
FIG. 2A illustrates an example of establishment of reference lines.
Figure 2B:
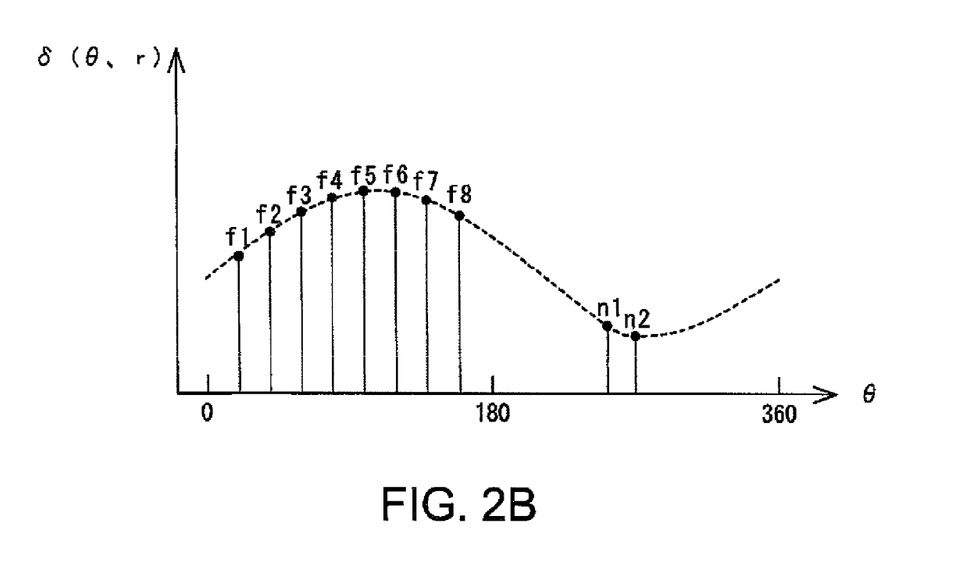
FIG. 2B is a graph showing a method for calculating aspherical surface addition quantities between the reference lines by interpolation.

FIG. 2A shows the general idea about the establishment of the reference lines in the aspherical surface addition quantity determining step. The spectacle lens shown in FIGS. 2A and 2B is a progressive-power lens of the distance and near combination design where the distance portion occupies the upper half of the lens as shown in FIG. 1. The reference for the spectacle lens design in the aspherical surface addition quantity determining step is generally the geometrical center of the spectacle lens, and uses the geometrical center as the center of the lens. It is possible, however, to select an arbitrary point in the vicinity of the geometrical center as the central point. According to the progressive-power lens based on the distance and near combination design, the geometric center of the spectacle lens practically agrees with the distance center as illustrated in FIG. 1.

In the step for setting the reference lines in the distance portion, at least two reference lines linearly extending from the geometric center GC through the area of the distance portion to the spectacle lens edge in the radial directions are established. In this case, the inclination angle with respect to the vision on the nose side is different from that on the ear side with the boundary of the vertical line passing the geometrical center, that is, the main meridian in the distance portion, and thus the aspherical surface quantity to be added to the respective sides are asymmetric. It is therefore preferable to establish the same number of reference lines for the left side and the right side at equal angle intervals with the boundary of the main meridian. The accuracy for detecting the power of the distance portion rises as the number of the reference lines increases.

FIG. 2A shows an example where eight reference lines δf1 through δf8 are established in the distance portion, four of which lines are provided on the left side and the other lines on the right side of the main meridian. These eight reference lines are established at equal angle intervals of 20 degrees in the anticlockwise direction from an X axis passing the geometrical center GC and extending in the horizontal direction. The eight reference lines are symmetrically disposed in the left-right direction with respect to the main meridian as the symmetric axis. It is not necessary to dispose the reference lines at equal angle intervals since interpolation is not affected by the non-equality of line arrangement.

In the step for establishing the reference lines in the near portion, at least two reference lines linearly extending from the geometrical center GC through the region of the near portion to the spectacle lens edge in the radial directions are established. In the example shown in FIG. 2A, two reference lines δn1 and δn2 are straight lines connecting the central point GC and edge points dividing the circular arc of the sectorial near portion into three parts. The aspherical surface addition quantities are asymmetric on the left side and the right side in the near portion similarly to the distance portion, and it is thus preferable to establish the reference line in each of the left and right regions with the boundary of the main meridian. For example, it is possible to determine the reference lines extending from the geometrical center GC of the spectacle lens toward the lens edge in the region of the near portion such that the reference lines divide the circular arc of the sectorial near portion into five equal parts, seven equal parts, or nine equal parts. In this case, the reference lines are not required to be disposed at equal angle intervals similarly to the case of the distance portion. The accuracy for detecting the power of the near portion rises as the number of the reference lines increases.

After the reference lines are established, the aspherical surface addition quantity is determined for the power along each reference line thus established. The aspherical surface addition quantity can be determined by a known method which obtains the optimum aspherical surface addition quantity for the power along each reference line based on calculations of the dioptric power, astigmatism, prismatic power and the like by ray tracing under the same condition as that when the spectacle lens is attached to the eye. The aspherical addition quantity herein refers to an aspherical quantity to be added to the reference progressive refractive surface (minus addition in some cases) to form a new surface.

There are five methods for calculating the aspherical surface addition quantity. Initially, the coordinate system of the spectacle lens is defined such that it includes the X axis extending in the left-right direction, the Y axis extending in the up-down direction (distance-near direction), and the Z axis in the depth direction when the progressive refractive surface is viewed from the front under the lens wearing condition. In this system, the center point GC of the respective reference lines is positioned at the origin (x, y, z)=(0,0,0).

The first method for calculating the aspherical surface addition quantity directly calculates the coordinates of the aspherical surface addition quantity in the Z axis. A coordinate $z_p$ of the reference progressive refractive surface in the depth direction is expressed by the following function of the coordinates (x,y):

$$Z_p = f(x,y)$$

When an aspherical surface addition quantity δ in the Z axis direction is added to $Z_p$, a synthesized coordinate in the Z axis direction after addition, that is, a new coordinate of the progressive refractive surface is $Z_t$ which is expressed by the following equation:

$$Z_t = Z_p + \delta$$

In this case, the vicinity of the lens central point GC contains less prism and thus less astigmatism is produced therein. Therefore, the aspherical surface addition quantity to be added thereto is small. However, light entering the lens outer peripheral area from the eye has an angle, and thus astigmatism is easily produced in that area. Therefore, the aspherical surface addition quantity to be added thereto to correct the astigmatism is generally large. The ideal aspherical surface addition quantity to be practically added considerably varies depending on the prescription of the user (dioptric power of lens), but this quantity changes according to a distance r from the central point GC. Therefore, the optimum aspherical surface addition quantity δ to be added is represented by the function of the distance r from the central point GC expressed by the following equation:

$$r = (x^2 + y^2)^{1/2}$$

When an angle θ in the anticlockwise direction from the starting point of X axis passing the geometrical center GC is established as illustrated in FIG. 2A, for example, the aspherical surface addition quantity δ is expressed by the function of (θ, r). The same is true for the following calculation methods.

The first method for calculating the aspherical surface addition quantity which directly calculates the coordinates provides the advantage that the calculation is facilitated.

The second method for calculating the aspherical surface addition quantity uses the relation expressed by the equation $dz_t = dz_p + \delta$, where: an inclination of the reference progressive refractive surface in the radial direction is $dz_p$; and a new inclination of the progressive refractive surface is $dz_t$.

The second method for calculating aspherical surface addition quantity which calculates distributions of inclination provides the advantage that prism quantity control is facilitated. The Z coordinate can be calculated from the origin by integration.

The third method for calculating the aspherical surface addition quantity uses the relation expressed by the equation $C_t=C_p+\delta$, where: a curvature of the reference progressive refractive surface in the radial direction is $C_p$; and a new curvature of the progressive refractive surface is $C_t$.

The third method for calculating aspherical surface addition quantity which calculates distributions of curvature provides the advantage that optical evaluation is facilitated. In this case, it is possible to facilitate designing of the lens, and thus to easily obtain the target prescription. The Z coordinate can be calculated from the origin by integration.

The fourth method for calculating the aspherical surface addition quantity uses the relation where the coordinate $Z_t$ of the new progressive refractive surface is expressed by the following equation (2), using a value $b_p$ defined by the following equation (1) where the Z coordinate of the progressive refractive surface is replaced with the curvature, with the coordinate of the reference progressive refractive surface expressed by $z_p$:

$$b_p = \frac{2z_p}{x^2 + y^2 + z_p^2} \quad (1)$$

$$z_t = \frac{(b_p + \delta)r^2}{1 + \sqrt{1 - (b_p + \delta)^2 r^2}} \quad (2)$$

The fourth method for calculating aspherical surface addition quantity which calculates distributions of curvature provides the advantage that optical evaluation is facilitated. In this case, it is possible to facilitate designing of the lens, and thus to easily obtain the target prescription. In addition, the Z coordinate can be calculated not by integration but by direct calculation.

The fifth method for calculating the aspherical surface addition quantity uses the relation where the coordinate $Z_t$ of the new progressive refractive surface is expressed by the following equation (3), using the value $b_p$ defined by the following equation (1) where the Z coordinate of the progressive refractive surface is replaced with the curvature, with the coordinate of the reference progressive refractive surface expressed by $z_p$:

$$b_p = \frac{2z_p}{x^2 + y^2 + z_p^2} \quad (1)$$

$$z_t = \frac{b_p r^2}{1 + \sqrt{1 - (1 + \delta)b_p^2 r^2}} \quad (3)$$

The fifth method for calculating aspherical surface addition quantity can design the lens such that curvature smoothly varies. Thus, this method provides a natural progressive surface shape causing no rapid change in dioptric power.

In the aspherical surface addition quantity determining step, the aspherical surface addition quantity $\delta$ is determined as the function of the distance r from the central point GC and the angle $\theta$ in the anticlockwise direction from the X axis along each reference line.

In addition to these methods for calculating the aspherical surface addition quantity, there are other methods such as a method for calculating a coefficient in an aspherical surface equation as a coordinate in the Z axis direction on each reference line such that the optical properties can be optimized by correcting the effects of the bend angle and dioptric power using ray tracing for each reference line.

After the aspherical surface addition quantity is determined for the power along each reference line, the aspherical surface addition quantity for the power in the region between each reference line by interpolation to calculate the aspherical surface addition quantities for the entire surface of the spectacle lens. The interpolation herein refers to a calculation method for obtaining function values at two or more points of a function and calculating a function value at a point between those points. Examples of well-known typical interpolation methods include Lagrange's interpolation and spline interpolation. In this invention, these typical interpolation methods can be used.

FIG. 2B is a graph in which ten points of values corresponding to the aspherical surface addition quantities $\delta$ at the reference lines $\delta f1$ through $\delta f8$ and $\delta n1$ and $\delta n2$ shown in FIG. 2A at the positions (lens edges in case of FIG. 2B) having an equal distance from the central point GC are plotted, assuming that the vertical axis indicates the values of the aspherical surface addition quantity $\delta$ calculated by the first through fifth methods, and that the transverse axis indicates the angle $\theta$ in the anticlockwise direction from the starting point of the X axis. The interpolation is a calculation method for obtaining an equation of a smoothly curved line indicated by a broken line passing all values of the ten points of the aspherical surface addition quantities $\delta$ shown in FIG. 2B. By this method, the optimum aspherical addition quantities can be determined for the regions of the entire spectacle lens.

In the prismatic power adding step, prismatic powers for canceling prismatic powers produced by the bend angle of the spectacle frame at the design reference points in the distance portion and the near portion are added to the object side or eyeball side refractive surface. The prismatic powers thus added give inclination to the refractive surface setting the respective design reference points as the center of the inclination such that the nose side corresponds to the base position. For the intermediate progressive portion, prismatic power for canceling prismatic power produced by the bend angle at a position on the main meridian, for example, according to the dioptric power is added to the entire progressive portion.

The presbyopia correcting progressive-power lens designed according to the progressive refractive surface setting step, astigmatic power adding step, aspherical surface addition quantity determining step, and prismatic power adding step discussed above provides the optimum optical properties when attached to the spectacle frame having a large bend angle. The respective steps are usually performed in the order described as above, which order only requires the smallest possible volume of calculations. In this case, the prismatic power adding step is performed later, and correction of the prismatic power produced by the bend angle is not considered in the aspherical surface addition quantity determining step. The orders of the astigmatic power adding step, the aspherical surface addition quantity determining step, and the prismatic power adding step may be switched, for example. Thus, the aspherical surface addition quantity determining step can be performed after the prismatic power adding step and astigmatic power adding step are completed.

It is possible to add astigmatic power for correcting the effect of the bend angle to the object side refractive surface, and add prismatic power for correcting the effect of the bend angle to the eyeball side refractive surface. Alternatively, these powers may be added to the opposite surfaces. It is further possible to add both the astigmatic power and prismatic power to the eyeball side or object side refractive surface, and provide a refractive surface having a combination of these powers.

The progressive-power lens considering dioptric power measurement by a lens meter is now discussed. According to the progressive-power lens, addition power is progressively added to the lens from the progressive starting point. Thus, when dioptric power is measured by the lens meter, the dioptric power measuring point is generally set at a position offset toward the distance portion from the progressive starting point by 5 to 10 mm considering the beam width of the lens meter. However, when aspherical surface design is provided up to the vicinity of the progressive starting point, astigmatism is produced at the time of dioptric power measurement by the lens meter. In this case, it is difficult to secure sufficient dioptric power for the lens.

Thus, in the distance and near combination design, it is preferable to add not an aspherical surface but a spherical surface to the area from the progressive starting point practically coinciding with the geometric center GC to a position having a predetermined distance r. The distance r is preferably 7 mm or larger and smaller than 12 mm to be sufficient for covering the dioptric power measuring point. The spherical surface design area thus provided does not considerably influence the optical properties since the ideal aspherical surface addition quantity to be added is originally small in the area in the vicinity of the progressive starting point located close to the optical axis.

According to the above description, the refractive surface for correcting astigmatism such as toric surface is not considered. For example, assuming that the progressive refractive surface is formed on the object side refractive surface (outside surface) and that the toric surface is formed on the eyeball side refractive surface (inside surface), the effect of the bend angle can be separately corrected for each surface. The correction to be given to the latter toric surface requires only one design reference point, and the astigmatic power adding step and the prismatic power adding step are performed in the manner similar to those discussed above. In the aspherical surface addition quantity determining step, the aspherical surface addition quantity to be added to the entire toric surface can be determined in the manner similar to that discussed above after establishing at least two reference lines extending in the direction of the astigmatic axis and the direction orthogonal to the astigmatic axis. It is also possible to add the correction for correcting the effect of the bend angle added to the toric surface formed on the eyeball side refractive surface to the progressive refractive surface formed on the object side refractive surface. In this case, both the correction for the progressive refractive surface and the correction for the toric surface are added to the progressive refractive surface formed on the object side refractive surface as the correction for correcting the effect of the bend angle. Since a toric surface having a simple shape is formed on the eyeball side refractive surface, shape formation and specular grinding of the eyeball side refractive surface can be performed by using a known hard abrasive plate. Thus, manufacturing is facilitated.

When both the progressive refractive surface and the toric surface for the astigmatic correction are formed on the eyeball side refractive surface, a refractive surface combining the progressive and toric surfaces is produced on the eyeball side surface. The method for designing the combination refractive surface for combining the progressive refractive surface and the toric surface is disclosed in WO97/19382, for example. The reference combination refractive surface can be established by this design method. Then, the design reference point is set for each of the distance portion and near portion on the eyeball side refractive surface to perform the astigmatic power adding step similar to that discussed above. In the aspherical surface addition quantity determining step, the aspherical surface addition quantity to be added to the entire lens surface can be determined in the manner similar to that discussed above after establishing at least additional two reference lines extending in the direction of the astigmatic axis and the direction orthogonal to the astigmatic axis. The prismatic power addition step can be performed in the manner similar to that discussed above.

Therefore, the spectacle lens design method according to the embodiment of the invention is a general-purpose method capable of designing a presbyopia correcting progressive-power lens to be attached to a spectacle frame having a large bend angle such as a wraparound-type frame.

The spectacle lens design method according to the embodiment of the invention is applicable to design and manufacture of a presbyopia correcting progressive-power lens which can provide the optimum optical properties when attached to a spectacle frame having a large bend angle such as a wrap-around-type frame.

What is claimed is:

1. A spectacle lens design method for designing a spectacle lens attached to a spectacle frame having a bend angle of 200 degrees or larger, comprising:

setting a distance portion, a near portion having power different from power of the distance portion, and a progressive portion which is disposed between the distance portion and the near portion and has power progressively varying on at least either an object side refractive surface or an eyeball side refractive surface included in the spectacle lens;

adding astigmatic power for canceling aberration produced by the bend angle of the spectacle frame at a design reference point of the distance portion to the entire distance portion and astigmatic power for canceling aberration produced by the bend angle of the spectacle frame at a design reference point of the near portion to the entire near portion on either the object side refractive surface or the eyeball side refractive surface of the spectacle lens;

determining an aspherical surface addition quantity which provides the optimum optical properties throughout the object side refractive surface or the eyeball side refractive surface of the spectacle lens; and adding prismatic power for canceling prismatic power produced by the bend angle of the spectacle frame at the design reference point of the distance portion to the entire distance portion and prismatic power for canceling prismatic power produced by the bend angle of the spectacle frame at the design reference point of the near portion to the entire near portion on either the object side refractive surface or the eyeball side refractive surface of the spectacle lens;

wherein the aspherical surface addition quantity determining step determines the aspherical surface addition quantity by setting a plurality of reference lines extending radially from a geometrical center of the spectacle lens through the distance portion of the spectacle lens to the edge of the spectacle lens and a plurality of reference lines extending through the near portion of the spectacle lens to the edge of the spectacle lens, calculating aspherical surface addition quantities providing the optimum optical properties on the respective reference lines, and calculating aspherical surface addition quantities for areas between the reference lines by interpolation.

2. The spectacle lens design method according to claim 1, wherein the distance portion located in an upper area of the lens for viewing a distant place, the near portion located in a lower area of the lens for viewing a near object, and the progressive portion smoothly connects the distance portion and the near portion for viewing an intermediate distance.

3. The spectacle lens design method according to claim 2, wherein the spectacle lens comprises a main meridian that extends in a central area of the distance portion in a vertical direction, turns in a direction toward a user's nose in the progressive portion, and extends in the vertical direction in the near portion.

4. The spectacle lens design method according to claim 1, wherein the aspherical surface addition quantity is determined as a function of a distance r from the geometrical center and an angle $\theta$ in the anticlockwise direction from an X axis along each reference line.

5. The spectacle lens design method according to claim 4, wherein at least two of the plurality of reference lines extending radially from a geometrical center of the spectacle lens through the distance portion of the spectacle lens are provided between the X axis and a Y axis.

6. The spectacle lens design method according to claim 1, wherein the interpolation obtains an equation of a smoothly curved line including the aspherical surface addition quantities on the respective reference lines.

* * * * *